US012137108B2

(12) United States Patent
Sinha et al.

(10) Patent No.: US 12,137,108 B2
(45) Date of Patent: Nov. 5, 2024

(54) LIVE LOG ANALYSIS FOR REAL-TIME DATA MANIPULATION AND VISUALIZATION OF A LARGE DATA SET

(71) Applicant: Zscaler, Inc., San Jose, CA (US)

(72) Inventors: Amit Sinha, San Jose, CA (US); Jasbir Singh Kaushal, Sunnyvale, CA (US); Tiffany Bui, San Jose, CA (US); Sundar Rajkumar Jothimani, San Jose, CA (US); Priyanka Pani, Los Altos, CA (US); Varun Singh, Milpitas, CA (US)

(73) Assignee: Zscaler, Inc., San Jose, CA (US)

( * ) Notice: Subject to any disclaimer, the term of this patent is extended or adjusted under 35 U.S.C. 154(b) by 731 days.

(21) Appl. No.: 16/986,347

(22) Filed: Aug. 6, 2020

(65) Prior Publication Data

US 2022/0046038 A1 Feb. 10, 2022

(51) Int. Cl.
*H04L 9/40* (2022.01)
*G06F 11/30* (2006.01)
*G06F 11/34* (2006.01)
*G06F 16/904* (2019.01)

(52) U.S. Cl.
CPC ...... *H04L 63/1425* (2013.01); *G06F 11/3006* (2013.01); *G06F 11/3072* (2013.01); *G06F 11/3476* (2013.01); *G06F 16/904* (2019.01)

(58) Field of Classification Search
CPC . H04L 63/1425; H04L 43/045; H04L 43/062; H04L 41/14; G06F 16/904; G06F 11/3006; G06F 11/3072; G06F 11/3476; G06F 16/2462; G06F 16/951; G06F 40/30
See application file for complete search history.

(56) References Cited

U.S. PATENT DOCUMENTS

| 8,286,239 B1 | 10/2012 | Sutton |
| 8,429,111 B1 | 4/2013 | Kailash et al. |
| 8,478,708 B1 | 7/2013 | Larcom |
| 8,484,726 B1 | 7/2013 | Sutton |

(Continued)

OTHER PUBLICATIONS

Zarate et al. "Optimal Sankey Diagrams via Integer Programming," 2018 IEEE Pacific Visualization Symposium (PacificVis) Year: 2018 | Conference Paper | Publisher: IEEE.*

(Continued)

*Primary Examiner* — Roderick Tolentino
(74) *Attorney, Agent, or Firm* — Baratta Law PLLC; Lawrence A. Baratta, Jr.; Ryan Odessa

(57) ABSTRACT

Systems and methods for visualization monitoring data from a cloud-based system include obtaining the monitoring data, wherein the monitoring data is based on transactions associated with a plurality of users of the cloud-based system; providing a Graphical User Interface (GUI); obtaining a plurality of filter selections for a plurality of filter types; and displaying a visualization comprising a Sankey diagram of the monitoring data with nodes in the Sankey diagram including each of the plurality of filter types and links between the nodes indicative of the transactions in the monitoring data. The monitoring data can be for one or more of cloud security service transactions, application access via a Zero Trust Network Access (ZTNA) service, and user experience metrics.

20 Claims, 12 Drawing Sheets

(56) References Cited

U.S. PATENT DOCUMENTS

| | | | |
|---|---|---|---|
| 9,118,689 | B1 | 8/2015 | Apte et al. |
| 10,142,362 | B2 | 11/2018 | Weith et al. |
| 10,225,740 | B2 | 3/2019 | Bansal et al. |
| 10,523,710 | B2 | 12/2019 | Sinha et al. |
| 10,861,202 | B1* | 12/2020 | Agnew ............... G06F 16/9535 |
| 2013/0339514 | A1 | 12/2013 | Crank et al. |
| 2015/0081701 | A1* | 3/2015 | Lerios .................. G06F 16/955 707/736 |
| 2016/0063072 | A1* | 3/2016 | N ......................... G06F 16/248 707/722 |
| 2017/0039233 | A1* | 2/2017 | Gauthier ............... G06F 3/0482 |
| 2017/0098318 | A1* | 4/2017 | Iannaccone ......... G06F 3/04855 |
| 2018/0077189 | A1* | 3/2018 | Doppke ................. H04L 63/20 |
| 2018/0114126 | A1* | 4/2018 | Das ....................... G06F 16/335 |
| 2019/0238432 | A1* | 8/2019 | Parag ................. H04L 67/1097 |
| 2019/0272654 | A1* | 9/2019 | Yaeli .................. G06F 16/9024 |
| 2019/0340304 | A1* | 11/2019 | Bak ...................... G06F 16/904 |

OTHER PUBLICATIONS

Gtoz et al., "DecisionFlow: Visual Analytics for High-Dimensional Temporal Event Sequence Data," IEEE Transactions on Visualization and Computer Graphics Year: 2014 | vol. 20, Issue: 12 | Journal Article | Publisher: IEEE.*

* cited by examiner

LIVE LOG ANALYSIS FOR REAL-TIME DATA MANIPULATION AND VISUALIZATION OF A LARGE DATA SET

FIELD OF THE DISCLOSURE

The present disclosure relates generally to networking and computing. More particularly, the present disclosure relates to systems and methods for a live log analysis for real-time data manipulation and visualization of a large data set, such as one from a cloud-based system.

BACKGROUND OF THE DISCLOSURE

Enterprises are moving their Information Technology (IT) infrastructure to the cloud. As described herein, an enterprise can also be referred to as an organization, a company, a tenant (with respect to a cloud service), etc., and each enterprise includes various users. Three example cloud services (also, a cloud service may be referred to as a cloud application) include Zscaler Internet Access (ZIA), Zscaler Private Access (ZPA), and Zscaler Digital Experience (ZDX), from Zscaler, Inc. (the assignee/applicant of the present application). The ZIA service can include firewalls, threat prevention, Deep Packet Inspection (DPI), Data Loss Prevention (DLP), policy enforcement, and the like. That is, ZIA can provide cloud-based security, regardless of device type, location, network, etc. The ZPA can include access control, microservice segmentation, etc. for Zero Trust Network Access (ZTNA). For example, the ZIA service can provide a user with secure Internet Access, and the ZPA service can provide a user with access to enterprise resources in lieu of traditional Virtual Private Networks (VPNs). The ZDX service can provide monitoring and improving user experience. Of course, there are various other types of services, and all such services are contemplated herein, and these are just presented as examples. Enterprises can utilize the ZIA, ZPA, and/or ZDX service to support their users through the cloud.

A key aspect of cloud services includes monitoring, logging, storing, and querying statistics associated with the operation of cloud services. For example, the operation of ZIA, ZPA, and/or ZDX can include a large number of users performing a large number of operations, transactions, etc., each of which is monitored, logged, and stored, and queried for a variety of purposes. Such statistics can include several thousand variables ranging from hardware, peripheral, network, operating system, memory, process variables indicating errors, exceptions, and events such as virus-detection counts and content classification counts. These variables are sampled over small sampling periods for logging purposes. Today, a large amount of data is generated by an enterprise that has end users (e.g., employees, contractors, partners, and visitors) accessing the Internet as part of their daily tasks. This data set includes Personally Identifiable Information (PII) information such as user IDs, device IDs, device names, device Internet Protocol (IP) addresses, as well as network activity metadata like protocol, Uniform Resource Locators (URLs) accessed, whether it was allowed or blocked, policies and rules that were evaluated, and other attributes. Each transaction is captured as a log record with several data points that provides a complete context of what resource the user intended to access, how they intended to access it, and the reason for allowing/blocking the access attempt, and the eventual policy enforcement result (allowed to access or blocked from accessing) of the enterprise's usage, compliance and legal policy.

Each enterprise seeks to gather insights and perform actions based on the metrics that they can derive out of the granular data that is logged and accessed. To create any custom lookups, the user configuring the views must have in-depth knowledge of the granular fields, the relationship between them, and the correlation of a specific set of fields to derive the insights a company requires. Disadvantageously, the present approach requires expert knowledge by the user. A problem with a large data set is it is simply difficult to understand and visualize, especially in a real-time manner, i.e., "live logs." There is a need to provide systems and methods to manipulate the large data set in a user-friendly manner to provide visualizations and actionable items. That is, there is a need for a user interface that is not only graphically unique, but enables users to take complex data, simplify it, and derive meaning from the data for operational use.

BRIEF SUMMARY OF THE DISCLOSURE

The present disclosure relates to systems and methods for a live log analysis for real-time data manipulation and visualization of a large data set, such as one from a cloud-based system. The present disclosure focuses on real-time data manipulation and visualization of a large data set, to provide actionable insights, leading a user to perform remedial action or optimize policies. The present disclosure seeks to remove a steep learning curve and the need for subject matter expertise to identify important metrics and perform contextual actions in the analysis of live logs. This helps users and enterprises to hit the ground running when it comes to enforcing policies, identifying exceptions, optimizing configurations, and fine-tuning their product deployment.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

Again, the present disclosure relates to systems and methods for a live log analysis for real-time data manipulation and visualization of a large data set, such as one from a cloud-based system. The present disclosure focuses on real-time data manipulation and visualization of a large data set, to provide actionable insights, leading a user to perform remedial action or optimize policies. The present disclosure seeks to remove a steep learning curve and the need for subject matter expertise to identify important metrics and perform contextual actions in the analysis of live logs. This helps users and enterprises to hit the ground running when it comes to enforcing policies, identifying exceptions, optimizing configurations, and fine-tuning their product deployment.

Cloud-Based System

Figure 1:
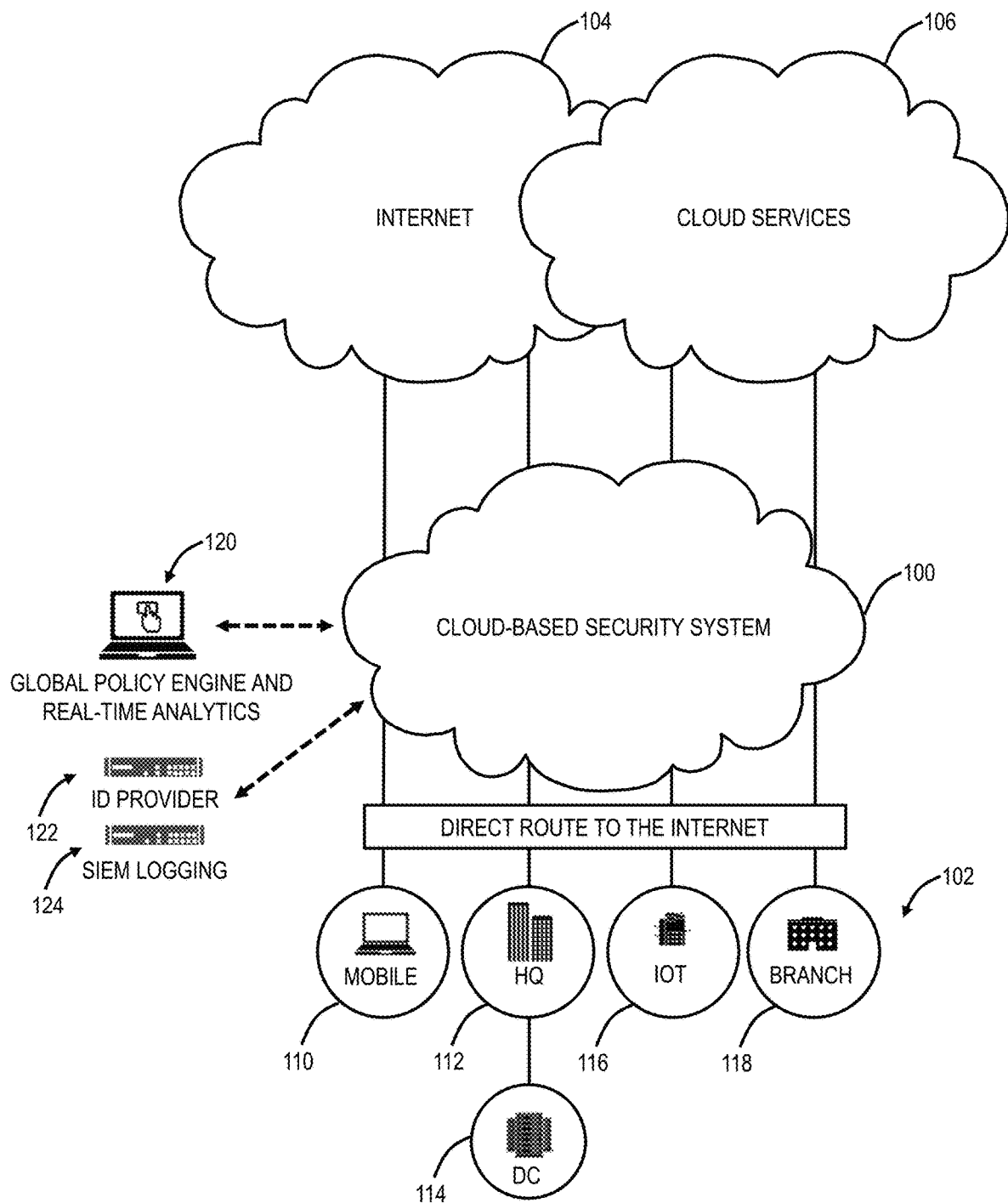
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
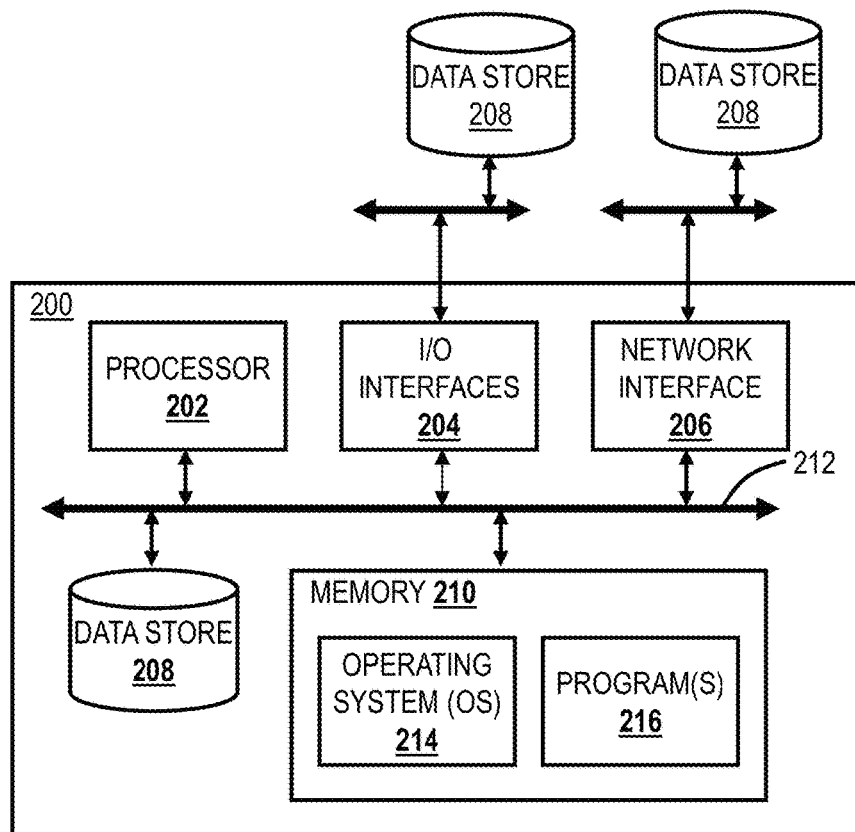

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
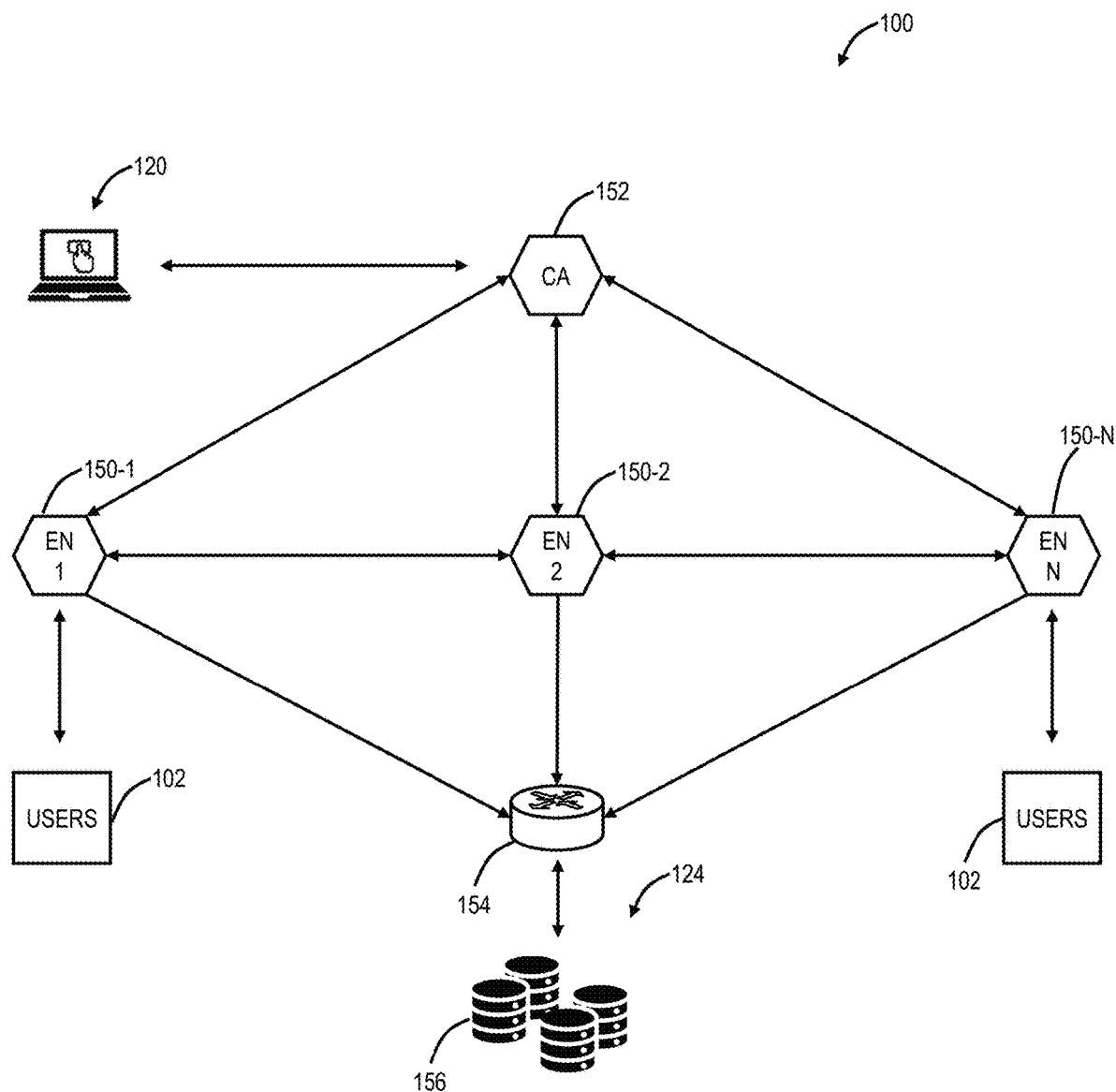
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. That is, a single node 150, 152 can be a cluster of devices. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
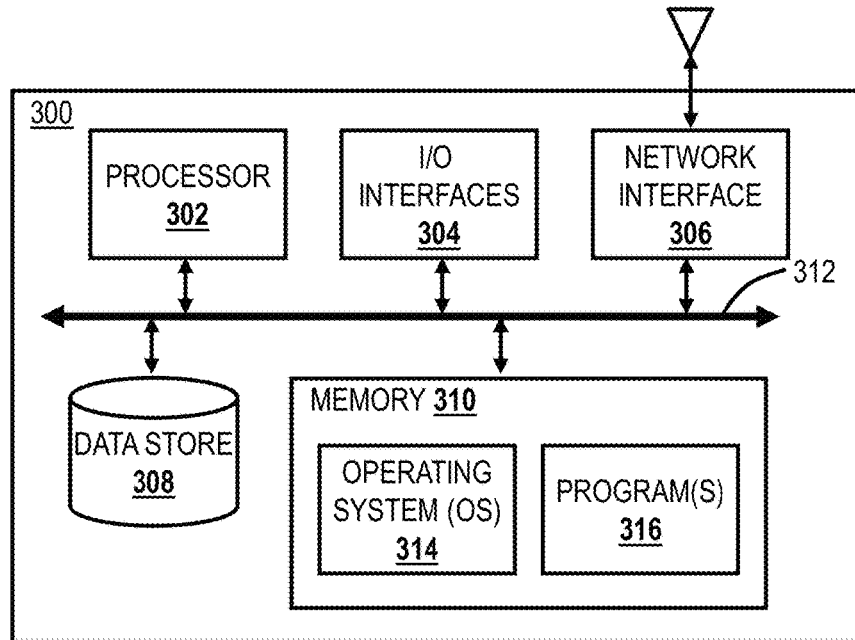

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
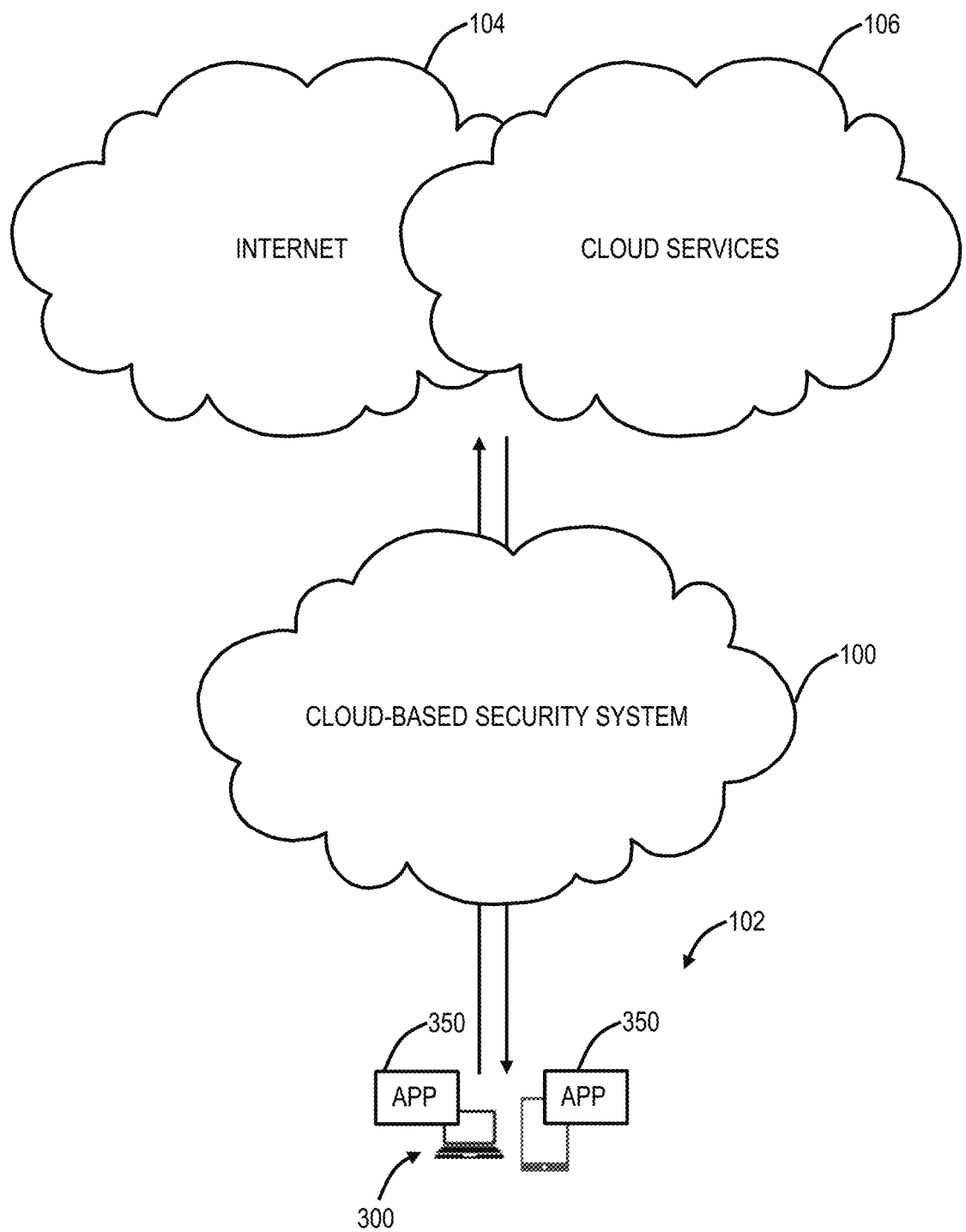
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 before accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figure 6:
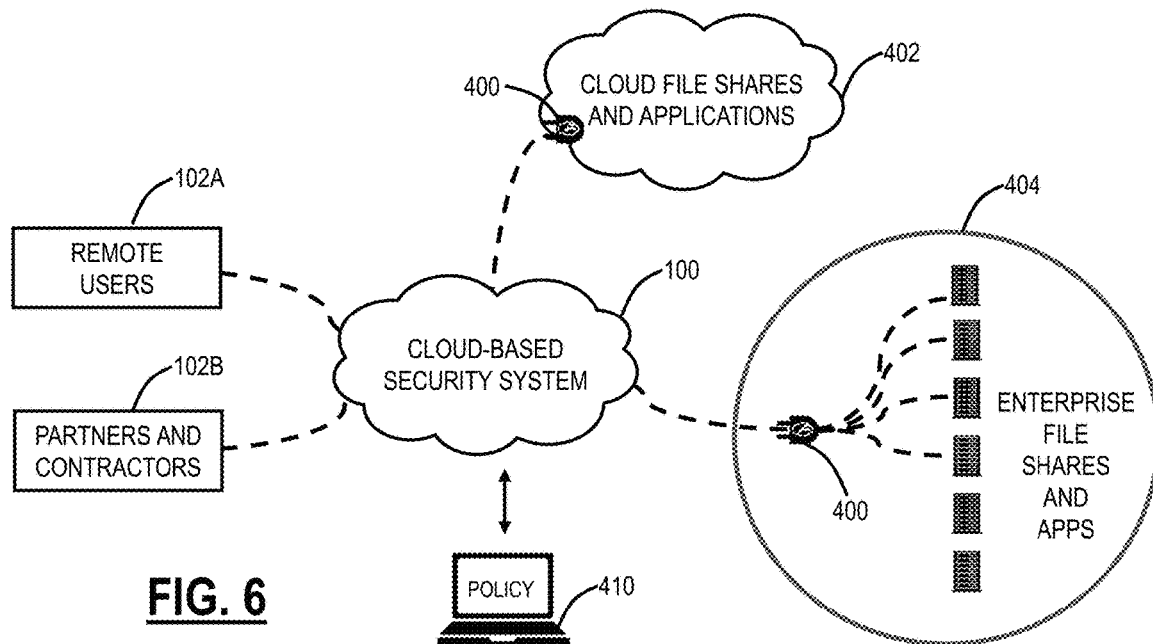
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or applications 404 in an enterprise network, connected to enterprise file shares and applications. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority node 152 to push policy 410, and the cloud-based system 100 to stitch the applications 402, 404 and the software connectors 400 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end-users and enterprises. FIG. 6 can include the ZPA service from Zscaler, Inc.

Digital Experience Monitoring

Figure 7:
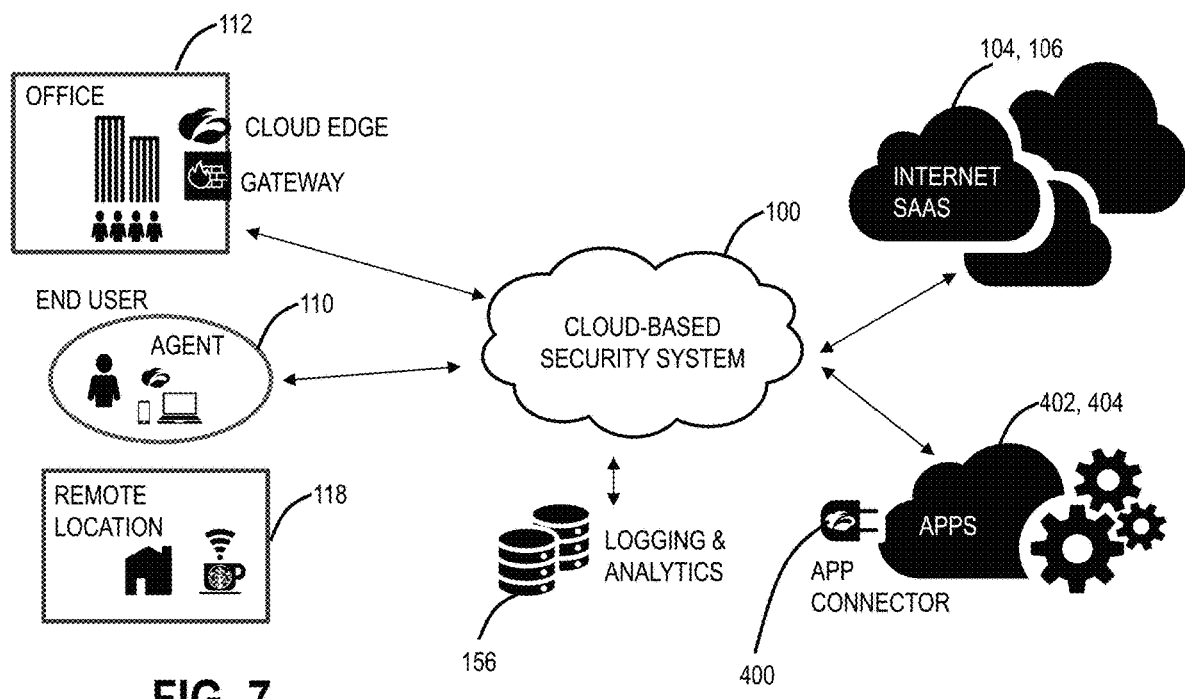
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| System details | Network (config) |
| --- | --- |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Live Log Analysis

The present disclosure refers to a live log analysis, which is a Graphical User Interface (GUI) and process for sorting through contextual data by manipulating large sets of real-time data using a variety of interactive components described herein to manage and review policies based on the data set. The contextual data, i.e., monitoring data, can be from the cloud-based system 100 (or another type of system) providing security (e.g., cloud-based security-as-a-service), network access (e.g., ZTNA), user monitoring (QoE/QoS monitoring), etc. Again, a key aspect of the cloud-based system 100 is there is a large amount of real-time monitoring data. It is difficult to digest this real-time monitoring data to determine actionable items, without a user having expert knowledge and experience. The objective here of the live log analysis is to provide an interface that is not only graphically unique but also allows users to take complex data, simplify it, and make it more meaningful to their operational use, reducing the level of expertise and experience needed to digest the real-time data. Of course, the monitoring data can also be historical (in addition to real-time). As described herein, the term monitoring data is used, and this includes any data obtained from monitoring in the cloud-based system 100 or similar.

Figure 8:
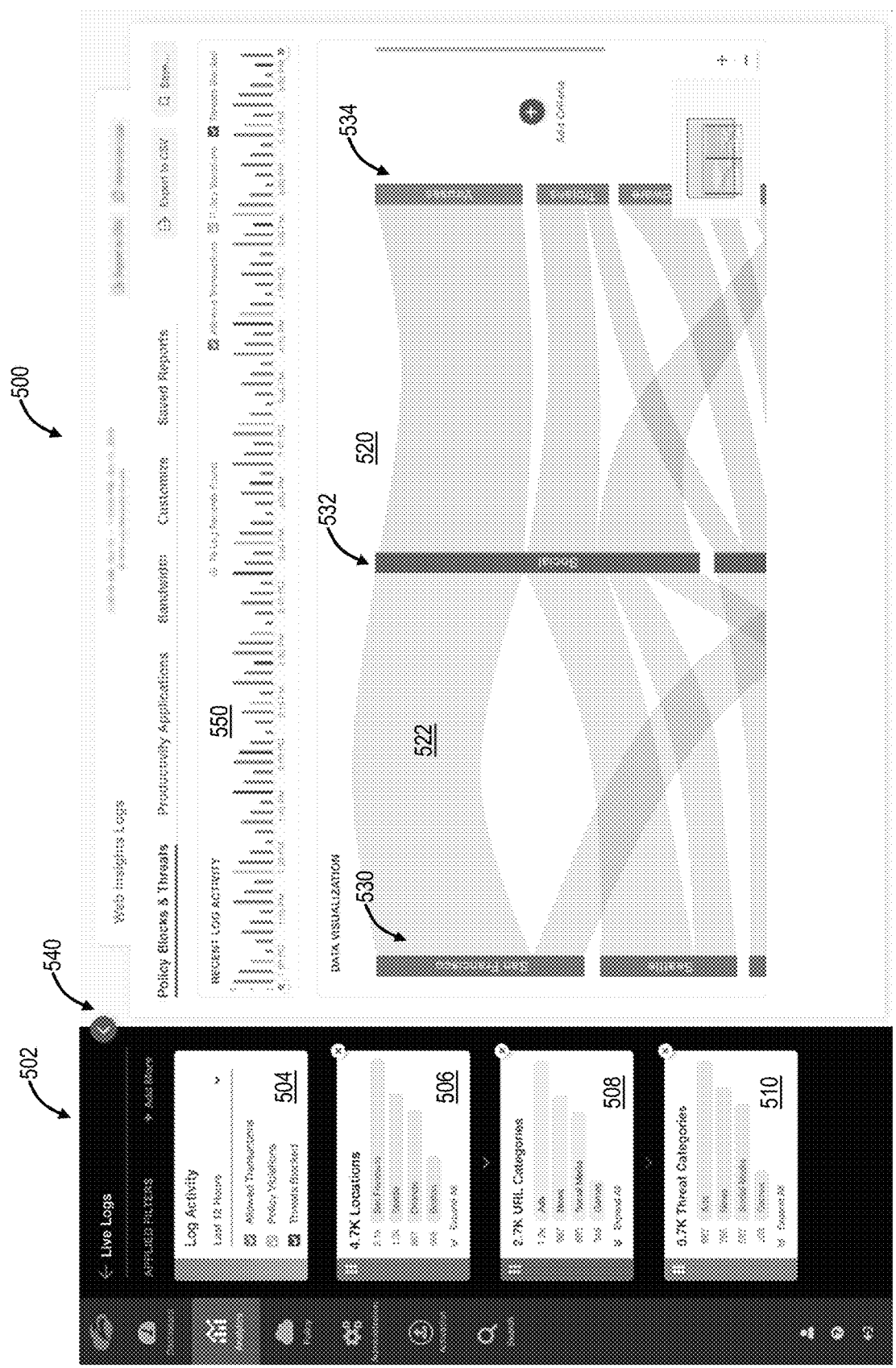
FIG. 8 is a screenshot of a live log analysis GUI using a Sankey diagram for visualization of real-time data.

FIG. 8 is a screenshot of a live log analysis GUI 500 using a Sankey diagram for data visualization of the real-time data. The Sankey diagram used herein is a flow diagram with an x-axis representing time and width of the lines used to convey values. The GUI 500 includes a filter card layout 502, illustrated on the left side. The filter card layout 502 allows a user to apply multiple filters on a large set of data for the monitoring data. The filters can include a combination of filter types such as for example, time range, locations, URL categories, threat categories, etc. Also, the filter card can include a log activity selection 504, where the monitoring data can be any of allowed transactions, policy violations, and threats blocked. These each refer to a specific transaction in the cloud-based system 100. In the example of FIG. 8, the filter card layout 502 includes three example filter cards 506, 508, 510, namely locations (4.7k transactions), URL categories (2.7k transactions), and threat categories (0.7k categories).

Those skilled in the art will appreciate other filter cards are also contemplated. For example, the filter cards can include, in addition to locations, URL categories, and threat categories, without limitation, transactions processed, threats blocked, total bandwidth, a number of users, locations & sublocations, as well as cloud service subscriptions. The filter cards can also include Threats Blocked by Category (Antivirus Threats, Sandboxed Threats, Advanced Threats), Browser Exploits, Phishing, and Cross-Site Scripting, etc. The filter cards can also include Top Locations by the number of Hosted Applications, Top Users by the number of Used Applications, where users are coming from, Top Protocols for the user's Private Applications, Bandwidth Trends (download/upload). Finally, the filter cards can include any of the user experience data described herein. That is, the filter cards can be anything that has a quantity for visualization of security, network access, user experience, etc.

Figure 9:
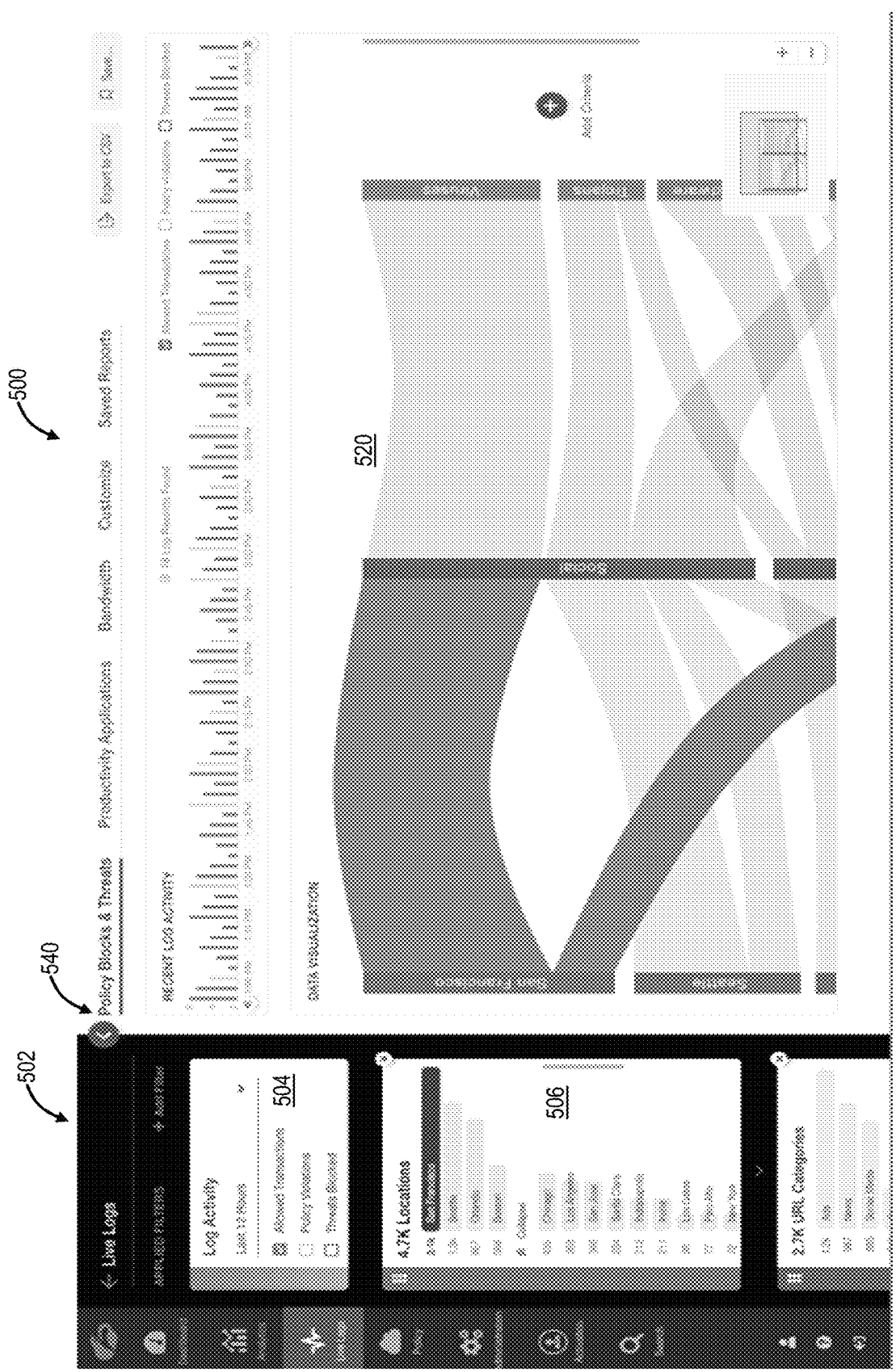
FIG. 9 is a screenshot of the live log analysis GUI of FIG. 8 where the locations filter is expanded.

Also, when a user selects the desired filter, the user can also drill in on the granular filter values associated with those filter types. FIG. 9 is a screenshot of the live log analysis GUI 500, where the locations filter 506 is expanded. Also, the log activity selection 504 has only the allowed transactions selected. The filter values are displayed as a horizontal bar graph in the Sankey diagram. By hovering over the filter values within a specified filter card and clicking on it, it highlights the corresponding flow in the Sankey diagram, such as the San Francisco location in FIG. 9. The user can select multiple filters at once to drill in and simplify their data to make it more meaningful to their diagnostics.

Back in FIG. 8, the filter cards allow a user to interact with the filter values as well as sorting the order of their data diagnostics. The filter card layout 502 includes the filter cards 506, 508, 510 in order, from top to bottom. At the top of the filter card layout 502, the log activity selection 504 determines what information from the filter cards 506, 508, 510 are displayed in the Sankey diagram. The filter cards 506, 508, 510, from top to bottom, are displayed in a visualization 520 that is the Sankey diagram, from left to right. That is, the first filter card 506, e.g., locations, is displayed first in the visualization 520 on the left, the second filter card 508, e.g., URL categories, is displayed second in the middle of the visualization 520, and the third filter card 510, e.g., threat categories are displayed last on the right in the visualization 520.

The visualization 520 is a flow diagram showing flows 522 between nodes 530, 532, 534 in the Sankey diagram. Here, the visualization 520 includes nodes 530, 532, 534 form locations, URL categories, and threat categories, and the flows 522 connect the nodes 530, 532, 534 with a size (width of the flows 522) indicative of relative size (number or quantity of transactions. For example, in FIGS. 8 and 9, the San Francisco location has a large number of social URLs, more than the Seattle location. Also, the social URLs from the San Francisco location extend to viruses in the threat categories, etc. That is, the flows 522 visualize the quantity of the monitored data coming in, so it is obvious to a user. For example, a specific location is seeing a lot of threat categories, etc.

It is also color-coded, making it more intuitive for users to see the connection between the filter card type and the nodes 530, 532, 534 on the Sankey diagram. For example, if the user adds a URL Category filter type, it will be added as a blue-colored card. On the Sankey diagram, the node 530, 532, 534 that represents that filter type will also be blue. This makes it easier for users to see how their modification to the card order affects the data visualization in the Sankey diagram. Of course, other visual differentiators are also contemplated besides just color, e.g., shading, etc.

Figure 10:
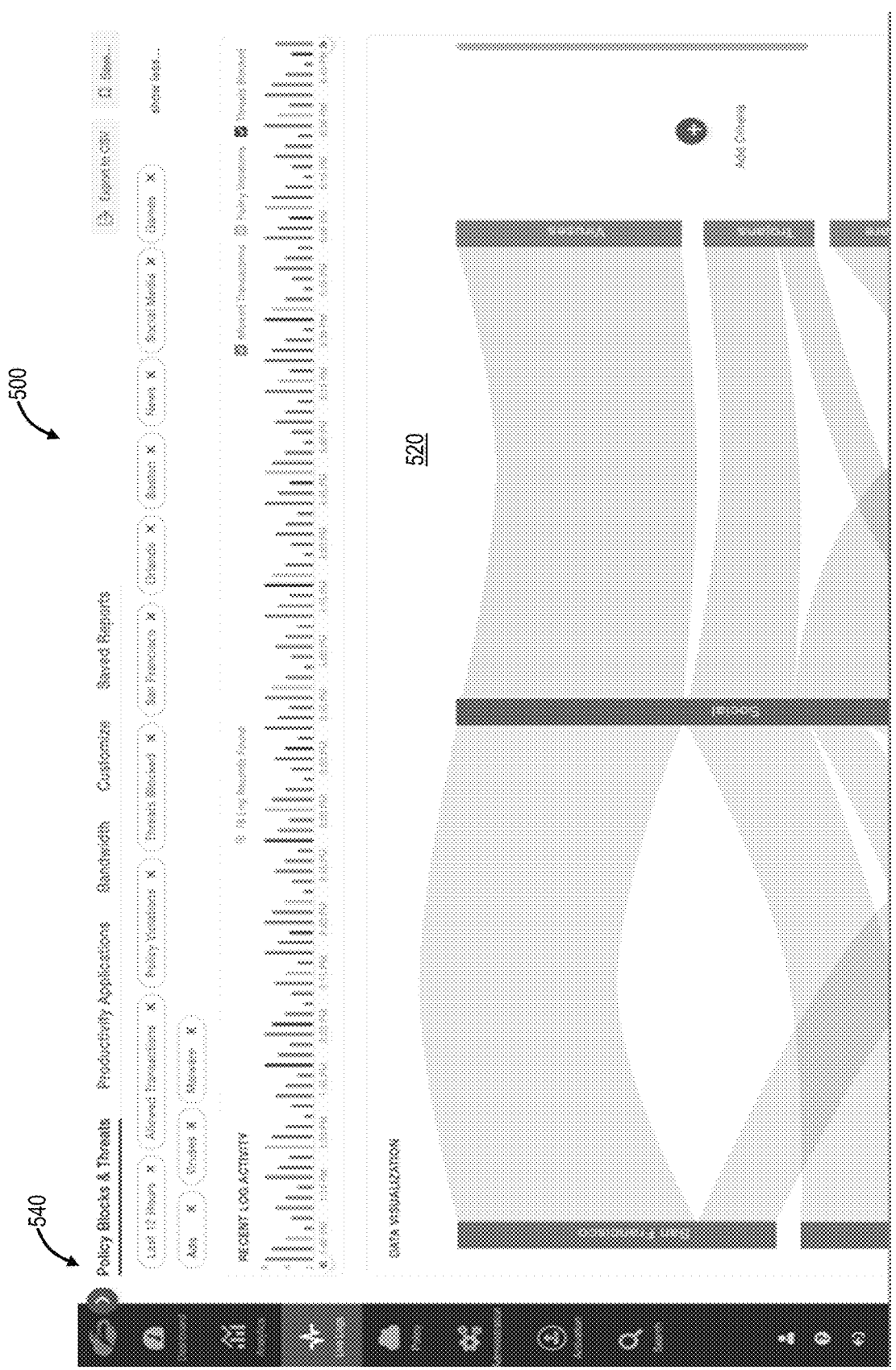
FIG. 10 is a screenshot of the live log analysis GUI of FIGS. 8 and 9 with the filter card layout minimized to expand the display of the visualization of the Sankey diagram.

The filter card layout 502 gives users the flexibility to adjust their view. When clicking on a chevron icon 540 in the top left corner of the screen, the user can collapse the filter card layout 502 to get a full-screen view of the visualization 520, such as illustrated in FIG. 10. This functionality allows a user to focus on one section and drill in on any areas of the graph they find importance in.

Log Activity Data

The GUI 500 can also include a bar chart 550 over time, illustrating the recent log activity for each of the items in the log activity selection 504, e.g., allowed transactions, policy violations, and threats blocked. Again, each can be color-coded, and the corresponding bar illustrates a number of each over time. In this example, the time is broken into 15-minute intervals.

Sankey Diagram

Again, a Sankey diagram is used to display the flow of different resources and their quantities in proportion to each other. The present disclosure provides a way to display a user's data diagnostics flow, and the Sankey diagram is best to represent this flow. The Sankey diagram includes multiple nodes 530, 532, 534 and links (flows 522). In the visualization 520, the nodes represent 530, 532, 534 the filter types, while the links represent the filter values, namely the log activity selection 504. The filter types allow users to sort through the data in terms of categories such as locations, threats blocked, URL categories, etc. The filter values allow users to drill further into the data for a specific category. The width of the links is directly associated with the amount of data. Therefore, the bigger the width of the links means a bigger quantity of data for that filter value. The Sankey diagram is also color-coded so that users can clearly see the divide in categories. The colors of the Sankey diagram reflect the same colors of the cards in the left navigation, making it easier for users to make a connection between the two elements. If the users adjust the order of the cards in the left navigation, then this will also change the order of the nodes 530, 532, 534 in the Sankey diagram. This allows users to manipulate their data visualization to hone in on the data of interest and perform certain actions on it.

Contextual Data and Policies Management

The objective of live log analysis is to ensure users have contextual data to manage relevant policies. The GUI 500 is rich with different filtering components to allow users to narrow in on specific data sets. Aside from using the card layout in the left navigation to break up data, multiple tabs are used so users can easily access different groups of data. There is also a log activity timeline component that makes filtering in on a specific time range easier for users. Having these different sets of filters not only gives users contextual data, but it also reduces any large potential loading time because massive amounts of information are not overloaded onto a page simultaneously. The default display can show the top five values in each filter type.

Figure 11:
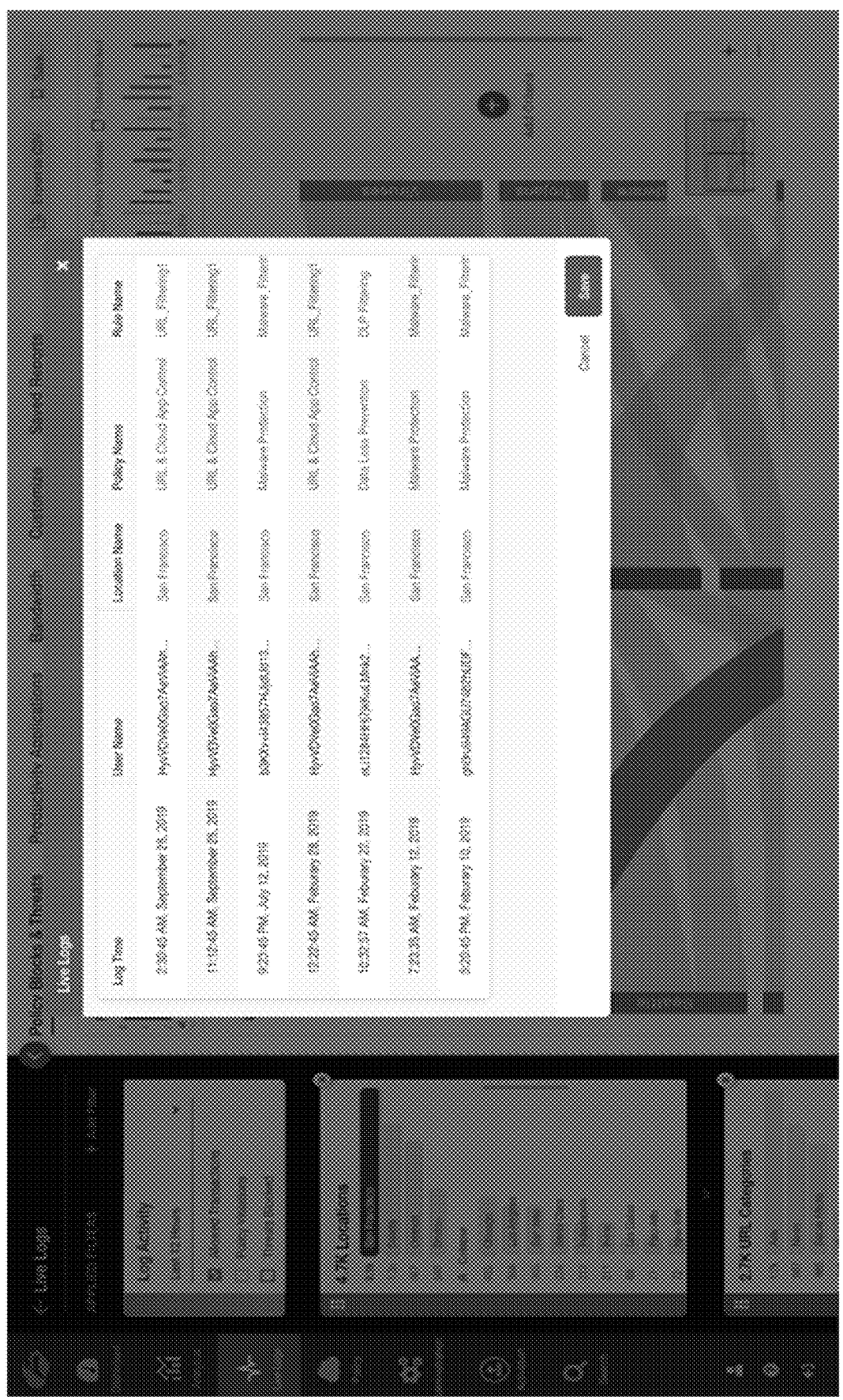
FIG. 11 is a screenshot of the live log analysis GUI of FIGS. 8-10 illustrating a table of policy names, rule names, etc. with hyperlinks that users can take action on, based on a selection in the Sankey diagram.

The GUI 500 also includes hover features that allow users to highlight certain sections of the Sankey diagram. When a user clicks on a specific set of data, it opens a log view for users to see metadata for that selected section. This metadata includes a table of policy names, rule names, etc. with hyperlinks that users can take action on, such as illustrated in FIG. 11. Clicking on this hyperlink drills users into areas they can edit and save their changes on.

Customizing and Saving Reports

Figure 12:
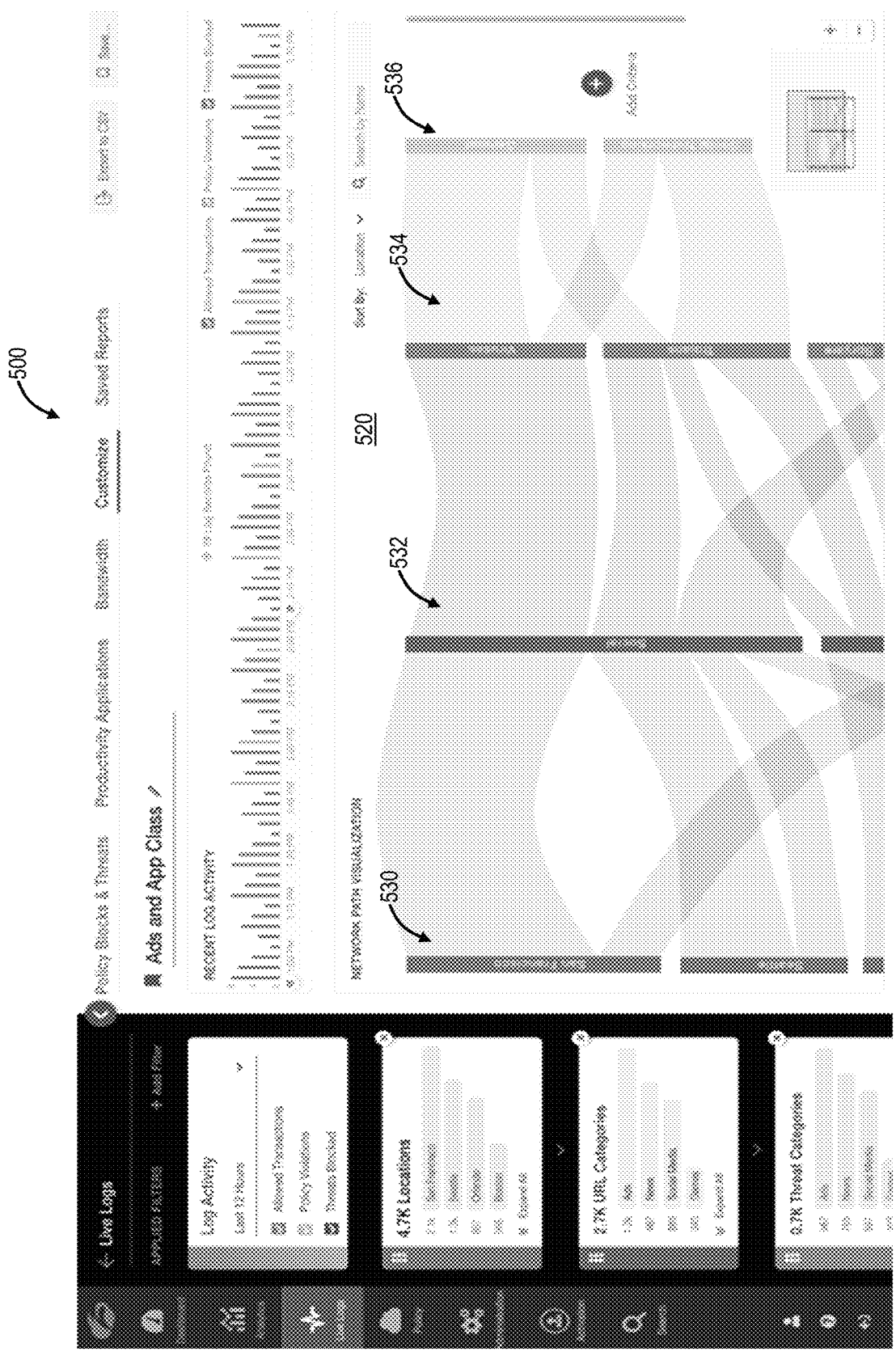
FIG. 12 is a screenshot of the GUI of FIGS. 8-11 illustrating a customized visualization.

Users can customize their reports and data visualization with the custom reports feature. This feature is displayed under the Customize tab making it intuitive for users to create their report by starting with a blank canvas and one large call-to-action in the center of the page that guides them to choose their data set. For the data to aggregate, users have to select at least two filters. A filter modal appears on the screen, which allows users to apply multiple filters at once in a non-disruptive manner quickly. When the filters are applied, the data is loaded onto the page, and users can make adjustments they want to their data set by interacting with components on the screen to sort, add, or remove certain filters. Users are customizing reports to perform specific actions on their data sets. To make it easier for users to come back to their custom reports, a Save feature makes this interface more user-friendly. The save button is located in the upper right-hand corner of the dashboard, and when users click on it, they can name the report however they want. Clicking on the save button immediately gives them feedback that their report was saved successfully and can be found under the Saved Reports tab. A bookmark icon is also displayed next to the report name to give users a visual queue that their particular data has been saved. FIG. 12 is a screenshot of the GUI 500, illustrating a customized visualization 520. Here, there is another node 536 in the Sankey diagram, added by selecting the add criteria button.

Figure 13:
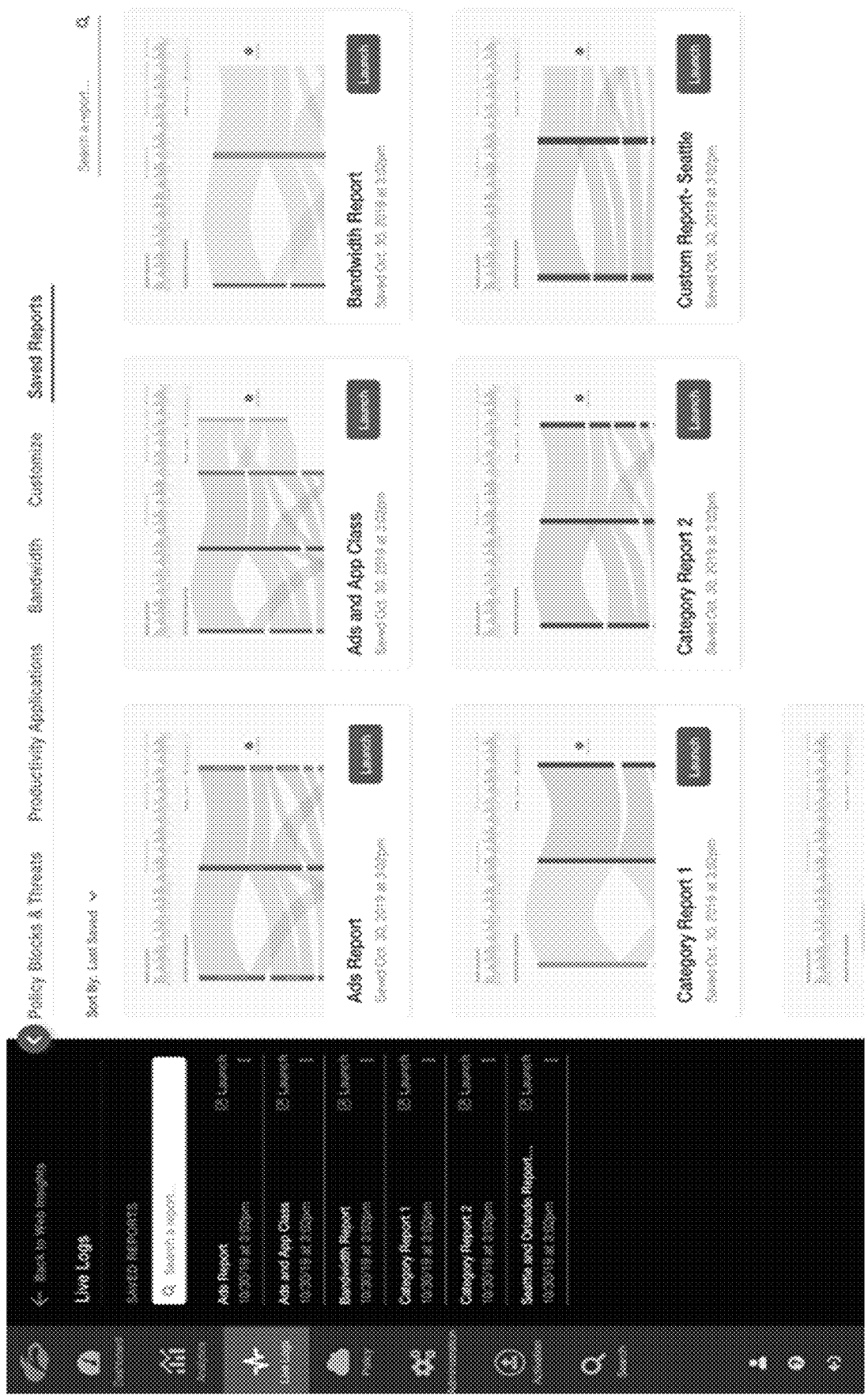
FIG. 13 is a screenshot of the GUI of FIGS. 8-12 illustrating a saved reports card.

To find previously saved reports, a Saved Reports tab is shown in the top navigation so that it is easily accessible to users. FIG. 13 is a screenshot of the GUI 500 illustrating a saved reports card. This section is displayed using a card layout design. With this design, users can visually see how many reports they saved as well as a small preview into each of these individual reports. Because all the reports can have different filters, the Sankey diagram can also be color-coded differently to reflect these filters. Therefore, if users remember which filters they have applied, the card layout can be used to help them recognize which report they are looking for. Additionally, there is a list view on the left-hand side of the interface that lets users search and scan their report by name. These features allow users to bring up their contextual data set to perform any future actions on it, such as reviewing and managing policies.

Chart and Visualization Design

For monitoring of users 102 in the cloud-based system 100, a user needs various charts and visualizations of the monitoring data. For example, there is a need to display bar, pie, and Sankey diagrams. Again, there is a massive amount of data, and the GUI 500 requires continuously re-rendering based on the user actions. The system must effectively handle the large volume of data and renders the most sensible segment of data with minimal resource utilization (browser cache, RAM). In an embodiment, React is used to implement the GUI 500 since it provides a rich set of built-in features/hooks that can customize the browser re-rendering.

Visualization Process

Figure 14:
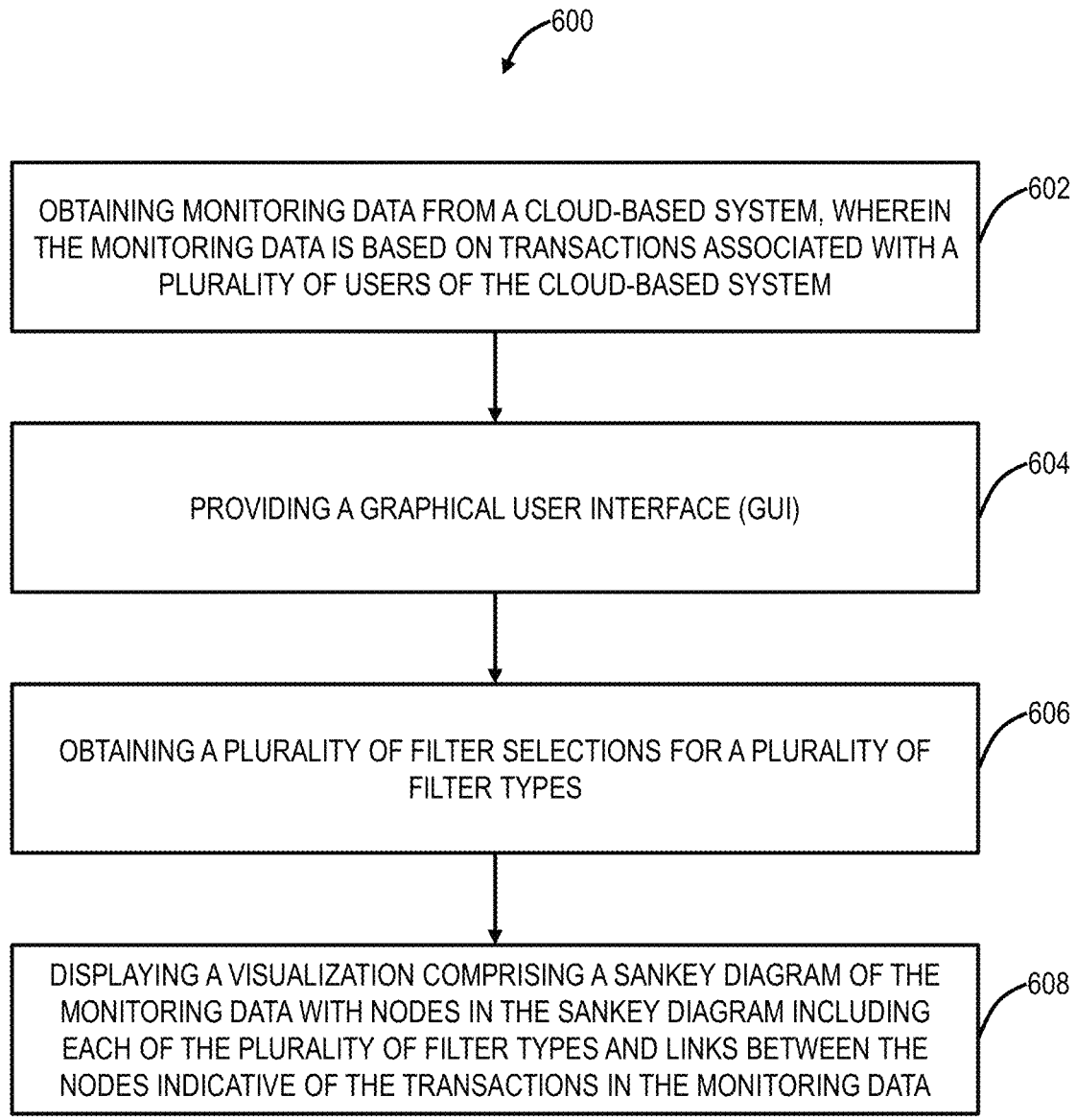
FIG. 14 is a flowchart of a visualization process.

FIG. 14 is a flowchart of a visualization process 600. The visualization process 600 can be a computer-implemented method, via an apparatus such as the server 200, and as computer-readable code stored on a non-transitory computer-readable storage medium. The visualization process 600 includes obtaining monitoring data from a cloud-based system, wherein the monitoring data is based on transactions associated with a plurality of users of the cloud-based system (step 602); providing a Graphical User Interface (GUI) (step 604); obtaining a plurality of filter selections for a plurality of filter types (step 606); and displaying a visualization comprising a Sankey diagram of the monitoring data with nodes in the Sankey diagram including each of the plurality of filter types and links between the nodes indicative of the transactions in the monitoring data (step 608).

The monitoring data can be for one or more of cloud security service transactions, application access via a Zero Trust Network Access (ZTNA) service, and user experience metrics. An order of the plurality of filter types can determine an order of the nodes in the Sankey diagram. The monitoring data can include real-time data from the cloud-based system. The visualization process 600 can further include obtaining a selection for log activity of the monitoring data, wherein the log activity determines types of data in the monitoring data; and filtering the monitoring data based on the selection.

The plurality of filter types can include any of location, Uniform Resource Locator (URL) categories, and threat categories. A first node in the Sankey diagram can be location and subsequent nodes can include anything that has a quantity for visualization of security, network access, and/or user experience, extending from the location. The nodes and the links can each have a same visual display as a corresponding filter type. The cloud-based system can include a plurality of tenants with the plurality of users each assigned thereto, and wherein the monitoring data is for a tenant of the plurality of tenants.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming at least one processor to perform steps of:
   obtaining monitoring data from a cloud-based system, wherein the monitoring data is based on transactions associated with a plurality of users of the cloud-based system;
   providing a Graphical User Interface (GUI);
   displaying, via the GUI, a filter card layout having plurality of selectable filter cards, each of the plurality of filter cards being associated with one of a plurality of filter types each having a plurality of filter values displayed as a horizontal bar graph therein, and wherein each of the plurality of filter cards is expandable responsive to a selection by a user via the GUI,
   obtaining, via the GUI, a plurality of filter card selections from the filter card layout provided via the GUI; and
   displaying a visualization comprising a Sankey diagram of the monitoring data with nodes in the Sankey diagram including each of the plurality of filter types and links between the nodes indicative of the transactions in the monitoring data.

2. The non-transitory computer-readable storage medium of claim 1, wherein the monitoring data is for one or more of cloud security service transactions, application access via a Zero Trust Network Access (ZTNA) service, and user experience metrics.

3. The non-transitory computer-readable storage medium of claim 1, wherein an order of the plurality of filter cards in the filter card layout determines an order of the nodes in the Sankey diagram, and wherein the steps further comprise:
   responsive to receive a selection of any of the plurality of filter values from any of the plurality of filter cards, highlighting a corresponding flow in the Sankey diagram based thereon.

4. The non-transitory computer-readable storage medium of claim 1, wherein the monitoring data includes real-time data from the cloud-based system, and wherein the horizontal bar graph within each of the filter cards displays live log data.

5. The non-transitory computer-readable storage medium of claim 1, wherein the steps further include
obtaining a selection for log activity of the monitoring data, wherein the log activity determines types of data in the monitoring data; and
filtering the monitoring data based on the selection.

6. The non-transitory computer-readable storage medium of claim 1, wherein the plurality of filter types include any of location, Uniform Resource Locator (URL) categories, and threat categories.

7. The non-transitory computer-readable storage medium of claim 1, wherein a first node in the Sankey diagram is location and subsequent nodes include anything that has a quantity for visualization of security, network access, and/or user experience, extending from the location.

8. The non-transitory computer-readable storage medium of claim 1, wherein the nodes and the links each have a same visual display as a corresponding filter type, and wherein each node is color-coded to its associated filter card in the filter card layout.

9. The non-transitory computer-readable storage medium of claim 1, wherein the cloud-based system includes a plurality of tenants with the plurality of users each assigned thereto, and wherein the monitoring data is for a tenant of the plurality of tenants.

10. An apparatus comprising:
a network interface communicatively coupled to a network;
a processor communicatively coupled to the network interface; and
memory storing computer-executable instructions that, when executed, cause the processor to
obtain monitoring data from a cloud-based system, wherein the monitoring data is based on transactions associated with a plurality of users of the cloud-based system,
provide a Graphical User Interface (GUI),
display, via the GUI, a filter card layout having plurality of selectable filter cards, each of the plurality of filter cards being associated with one of a plurality of filter types each having a plurality of filter values displayed as a horizontal bar graph therein, and wherein each of the plurality of filter cards is expandable graph responsive to a selection by a user via the GUI;
obtain, via the GUI, a plurality of filter card selections from the filter card layout provided via the GUI, and
cause a display of a visualization comprising a Sankey diagram of the monitoring data with nodes in the Sankey diagram including each of the plurality of filter types and links between the nodes indicative of the transactions in the monitoring data.

11. The apparatus of claim 10, wherein the monitoring data is for one or more of cloud security service transactions, application access via a Zero Trust Network Access (ZTNA) service, and user experience metrics.

12. The apparatus of claim 10, wherein an order of the plurality of filter cards in the filter card layout determines an order of the nodes in the Sankey diagram, and wherein the steps further comprise:
responsive to receiving a selection of any of the plurality of filter values from any of the plurality of filter cards, highlighting a corresponding flow in the Sankey diagram based thereon.

13. The apparatus of claim 10, wherein the monitoring data includes real-time data from the cloud-based system, and wherein the horizontal bar graph within each of the filter cards displays live log data.

14. The apparatus of claim 10, wherein the computer-executable instructions that, when executed, further cause the processor to
obtain a selection for log activity of the monitoring data, wherein the log activity determines types of data in the monitoring data, and
filter the monitoring data based on the selection.

15. The apparatus of claim 10, wherein the plurality of filter types include any of location, Uniform Resource Locator (URL) categories, and threat categories.

16. The apparatus of claim 10, wherein a first node in the Sankey diagram is location and subsequent nodes include anything that has a quantity for visualization of security, network access, and/or user experience, extending from the location.

17. The apparatus of claim 10, wherein the nodes and the links each have a same visual display as a corresponding filter type, and wherein each node is color-coded to its associated filter card in the filter card layout.

18. The apparatus of claim 10, wherein the cloud-based system includes a plurality of tenants with the plurality of users each assigned thereto, and wherein the monitoring data is for a tenant of the plurality of tenants.

19. A method comprising:
obtaining monitoring data from a cloud-based system, wherein the monitoring data is based on transactions associated with a plurality of users of the cloud-based system;
providing a Graphical User Interface (GUI);
displaying, via the GUI, a filter card layout having plurality of selectable filter cards, each of the plurality of filter cards being associated with one of a plurality of filter types each having a plurality of filter values displayed as a horizontal bar graph therein, and wherein each of the plurality of filter cards is expandable responsive to a selection by a user via the GUI;
obtaining, via the GUI, a plurality of filter card selections from the filter card layout provided via the GUI; and
displaying a visualization comprising a Sankey diagram of the monitoring data with nodes in the Sankey diagram including each of the plurality of filter types and links between the nodes indicative of the transactions in the monitoring data.

20. The method of claim 19, further comprising
obtaining a selection for log activity of the monitoring data, wherein the log activity determines types of data in the monitoring data; and
filtering the monitoring data based on the selection.

* * * * *